(12) United States Patent
Becerra beltran et al.

(10) Patent No.: US 11,881,696 B2
(45) Date of Patent: Jan. 23, 2024

(54) WIRING CLIP FOR VEHICLE ELECTRONICS

(71) Applicant: Ford Global Technologies, LLC, Dearborn, MI (US)

(72) Inventors: Carlos al Alberto Becerra beltran, Cuautitlan (MX); Juan Pablo Esquivel, Cuautitlan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 131 days.

(21) Appl. No.: 17/652,049

(22) Filed: Feb. 22, 2022

(65) Prior Publication Data
US 2023/0268726 A1 Aug. 24, 2023

(51) Int. Cl.
*H02G 3/32* (2006.01)
*B60R 16/02* (2006.01)

(52) U.S. Cl.
CPC ........... *H02G 3/32* (2013.01); *B60R 16/0215* (2013.01)

(58) Field of Classification Search
CPC ........ H02G 3/32; F16L 3/1025; F16L 3/1075; F16L 3/1083; F16L 3/1091; F16L 3/08; B60R 16/0215
See application file for complete search history.

(56) References Cited

U.S. PATENT DOCUMENTS

| | | | | | |
|---|---|---|---|---|---|
| 2,017,072 | A | * | 10/1935 | Minorsky | B63B 39/03 244/191 |
| 2,018,687 | A | * | 10/1935 | Alfred | F04F 1/00 137/802 |
| 3,991,960 | A | * | 11/1976 | Tanaka | H02G 3/32 248/68.1 |
| 4,340,322 | A | * | 7/1982 | Springett | F16L 1/203 405/166 |

(Continued)

FOREIGN PATENT DOCUMENTS

| EP | 1808629 A2 * | 7/2007 | ............ F16L 3/1025 |
|---|---|---|---|
| EP | 3702652 A1 * | 9/2020 | |

(Continued)

OTHER PUBLICATIONS

Federal Aviation Administration, Aircraft Electrical Wiring Interconnect System (EWIS) Best Practices, Aircraft EWIS Practices Job Aid 2.0, 1-176.

*Primary Examiner* — Eret C McNichols
(74) *Attorney, Agent, or Firm* — Frand Lollo; Eversheds Sutherland (US) LLP (57) ABSTRACT

This disclosure describes a wiring clip for vehicle electronics. An example wiring clip may include a base. The example wiring clip may also include a first upright extending from the base. The example wiring clip may also include an adjustable cover including a first end configured to be affixed to the first upright. The example wiring clip may also include a second upright extending from the base, wherein (Continued)

the wiring clip is configured to be removably affixed to a vehicle, wherein the wiring clip is configured to secure wiring of the vehicle within an area internal to the base, the first upright, the second upright, and the adjustable cover, and wherein the second upright includes a first hole and a second hole, wherein the wiring clip is configured to receive a second end of the adjustable cover through the first hole or the second hole.

14 Claims, 8 Drawing Sheets

(56) References Cited

U.S. PATENT DOCUMENTS

| | | |
|---|---|---|
| 5,161,759 A | 11/1992 | Burns et al. |
| 5,735,041 A | 4/1998 | Zaguskin et al. |
| 5,929,382 A | 7/1999 | Moore et al. |
| 5,961,081 A * | 10/1999 | Rinderer .................. H02G 3/32 |
| | | 248/68.1 |
| 5,988,570 A * | 11/1999 | Gretz ....................... H02G 3/32 |
| | | 248/89 |
| 7,140,070 B2 * | 11/2006 | Yuta ..................... B60R 16/0215 |
| | | 248/74.1 |
| 8,020,812 B2 * | 9/2011 | Matsuno ............... F16L 3/1075 |
| | | 24/336 |
| 8,356,778 B2 * | 1/2013 | Birli ........................ F16L 3/237 |
| | | 248/65 |
| 8,840,071 B2 * | 9/2014 | Oh ........................ F16L 3/1075 |
| | | 248/65 |
| 9,106,069 B2 * | 8/2015 | Frizzell .................... H02G 3/32 |
| 10,119,631 B2 * | 11/2018 | Toll ........................ F16L 3/1058 |
| 10,920,910 B1 * | 2/2021 | Gretz ...................... F16L 3/105 |
| 11,279,537 B2 * | 3/2022 | Wang .................. B65D 63/1027 |
| 11,359,751 B2 * | 6/2022 | White ..................... F16L 23/04 |
| 11,626,717 B2 * | 4/2023 | Gintz ................... H02G 3/0418 |
| | | 248/542 |
| 2014/0151514 A1 * | 6/2014 | Asai ......................... F16L 3/08 |
| | | 248/74.1 |
| 2016/0064120 A1 | 3/2016 | Wakabayashi et al. |
| 2022/0074521 A1 * | 3/2022 | Gallegos ............... F16L 3/1075 |

FOREIGN PATENT DOCUMENTS

| | | | | |
|---|---|---|---|---|
| GB | 2188694 A | * | 10/1987 | ............ F16L 3/1025 |
| JP | 2020187851 A | | 11/2020 | |

* cited by examiner

WIRING CLIP FOR VEHICLE ELECTRONICS

BACKGROUND

Vehicle electrical systems often include a collection of various wires and wiring harnesses that are routed through the vehicle for various purposes. For example, the electrical system may provide power from a battery of the vehicle to a component that requires power to operate. The electrical system may also be used to route communications between various vehicle systems. In some cases, wiring clips may be used to provide for more organized routing and also to secure any wiring against the vehicle.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements, which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

This disclosure relates to, among other things, a wiring clip for vehicle electronics. For example, one or more of such wiring clips may be integrated into the vehicle and may provide points at which wiring included in a vehicle electronic system may be secured to the vehicle. This may allow for the wiring to be retained in place rather than moving around the vehicle and may also provide for organizing routing of wiring throughout the vehicle. The wiring clip may include a number of features that may provide advantages over previous wire clips that may have been used in vehicles. For example, this wiring clip provides adaptive elements that allow for the area inside the wiring clip to be adjusted to allow for wire bundles of different sizes to be properly secured within a wiring clip. This wiring clip may thus provide a standardized clip that may be used in any part of the vehicle regardless of the size and/or number of wires that are routed through that particular area of the vehicle. Additionally, the wiring clip may include multiple structural elements that may be used to secure the wiring clip against different structures of the vehicle, allowing the wiring clip to be more effectively secured with respect to the vehicle.

Figure 1:
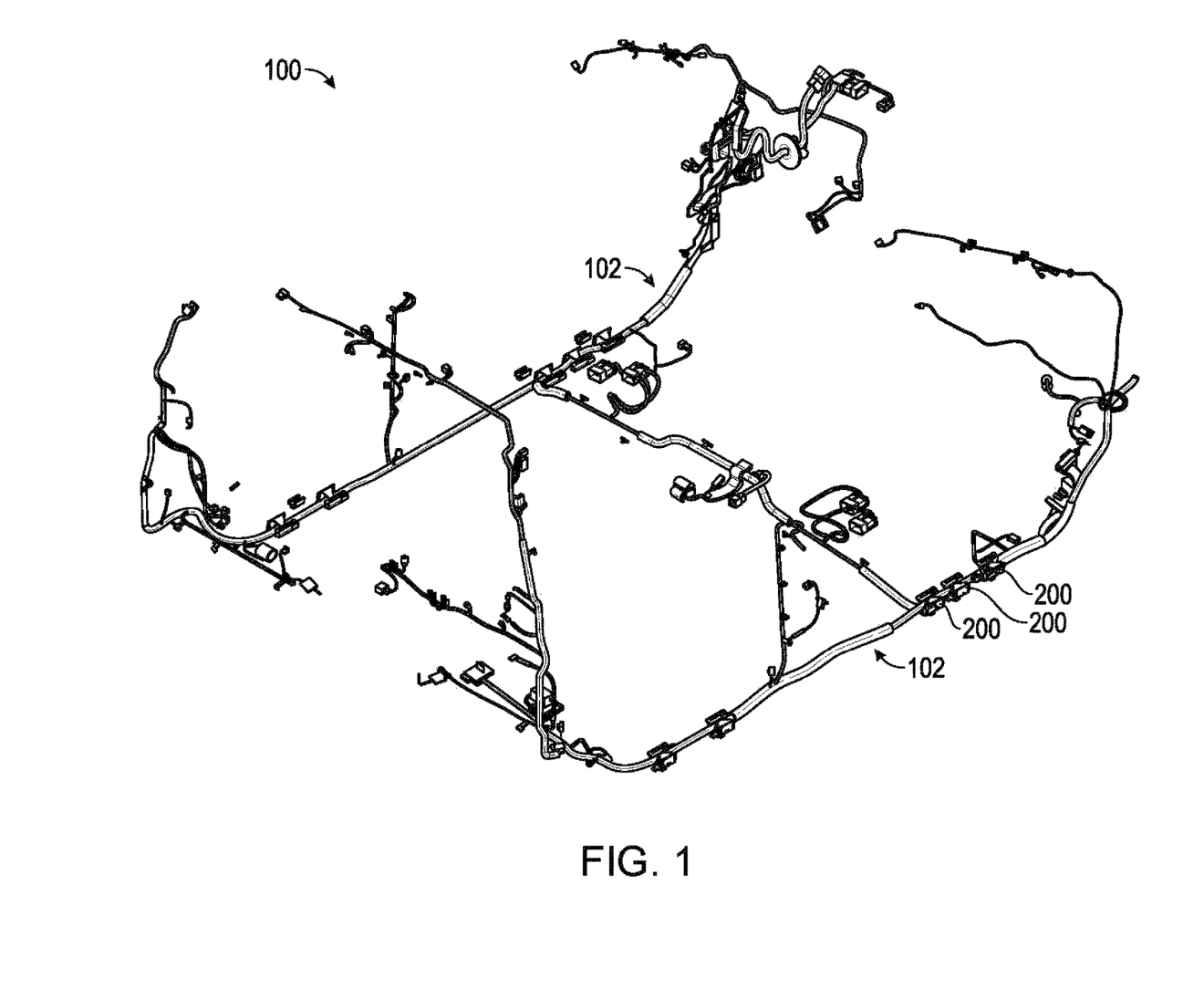
FIG. 1 illustrates an example vehicle wiring system, in accordance with one or more embodiments of the disclosure.

Turning to the figures, FIG. 1 illustrates an example vehicle wiring system 100, in accordance with one or more embodiments of the disclosure. The example vehicle wiring system 100 may illustrate one example of wiring that may be included within a vehicle's electrical system. The wiring system 100 may be used for a number of different purposes, such as providing power from one or more batteries of the vehicle (not shown in the figure) to different components of the vehicle that may require power in order to operate. For example, a taillight, headlight, dashboard, electronic door lock, and/or any other type of vehicle system may require at least some amount of power in order to operate. Thus, at least a portion of the wiring system 100 may be used to route the power from a battery of the vehicle to the locations of these different vehicle components.

The wiring system 100 may also be used to route communications signals as well. For example, a vehicle may include one or more electronic control units (ECUs) (for example, ECUs 817) that may be used to control different vehicle systems. Such signals may be transmitted between a controller area network (CAN) bus of the vehicle, through Ethernet, and/or through any other type of communication. The wiring system may also be used for any other purpose as well.

In one or more embodiments, any wires 102 included in the wiring system 100 may be routed through different portions of the vehicle. In some cases, it may be desired to route the wires in portions of the vehicle that are not visible to an operator of the vehicle for a number of different reasons (including aesthetic purposes). Additionally, it may be desirable to ensure that the wiring system 100 is organized and the manner in which the wires 102 are routed is controlled and maintained. This may be beneficial for a number of reasons, such as easier troubleshooting, installation of new wiring, etc. To ensure that the routing of the wires 102 is maintained in an intended configuration, one or more wiring clips 200 may be used to secure different portions of the wiring 102 to the vehicle.

Figure 2:
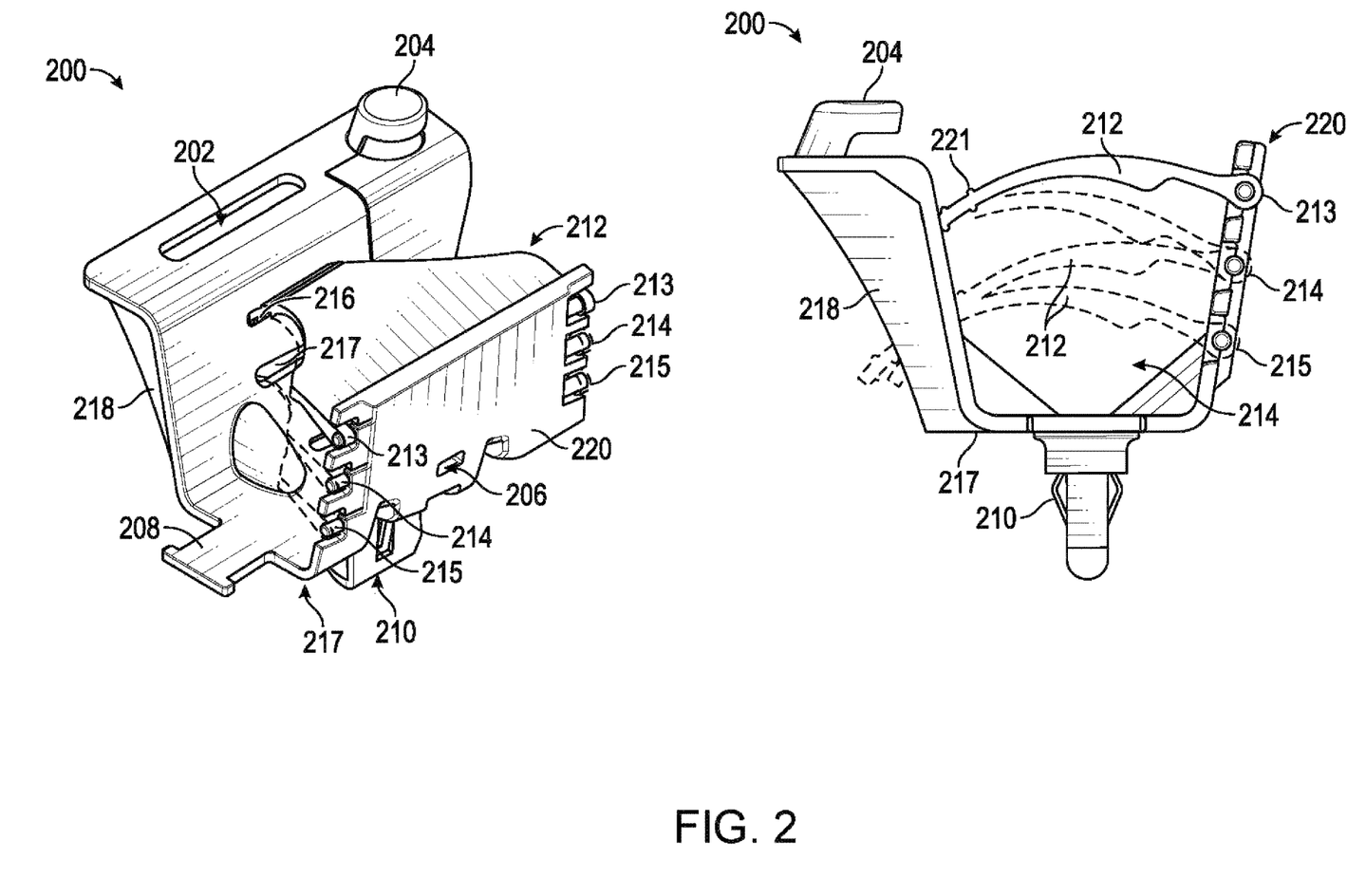
FIG. 2 illustrates an example wiring clip, in accordance with one or more embodiments of the disclosure.

FIG. 2 illustrates an example wiring clip 200, in accordance with one or more embodiments of the disclosure. In one or more embodiments, the wiring clip 200 may be used for purposes of routing wiring associated with a vehicle electrical system through the vehicle. The wires may pass through in area 214 that is internal to the wiring clip 200, and the wiring clip 200 may serve to maintain the wiring within the area 214 and also to secure the wires to a particular location in the vehicle. This may prevent the wiring from changing position over time and may also serve to organize the wiring. The example wiring clip 200 may include at least a kick plate slot 202, a first protrusion 204, one or more holes 206, a second protrusion 208, a retaining element 210, and/or an adjustable cover 212.

In one or more embodiments, the figure may illustrate one example shape configuration of the wiring clip 200. For example, the wiring clip 200 may include a base 217 with two uprights (for example, a first upright 218 and a second upright 220) extending from the base 217. The kick plate slot 202, first protrusion 204, and/or adjustable cover holes (described below) may be included on the first upright 218 and at least one of the one or more holes 206 and one or more engagement points (described below) for the adjustable cover 212 may be included on the second upright 220.

Additionally, the second protrusion 204 and/or the retaining element 210 may be located on the base. This is just one example shape configuration and is not intended to be limiting in any way. For example, the shape of the wiring clip 200 may include any other shape and the different elements of the wiring clip 200 may be positioned at any other varying locations on the wiring clip 200.

Figure 4:
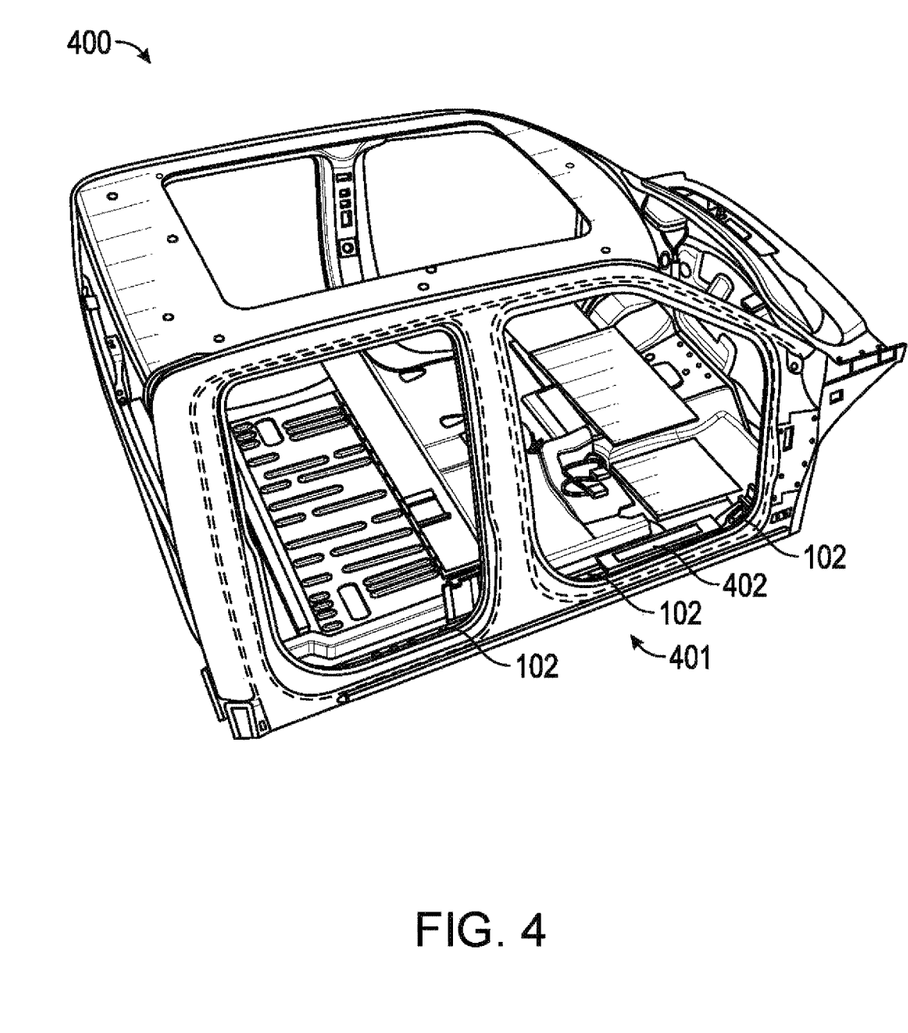
FIG. 4 illustrates an example vehicle, in accordance with one or more embodiments of this disclosure.

In one or more embodiments, the kick plate slot 202 may be an opening in the wiring clip 200 that may be used to secure the wiring clip 200 to a kick plate of the vehicle. The kick plate of the vehicle may refer to a portion of the vehicle that is located inside a door frame of the vehicle (as illustrated in FIG. 4). Certain wiring of the vehicle's electrical system may be routed through this area of the vehicle. Thus, the kick plate may serve as a portion of the vehicle to which the wiring clip 200 may be secured. The manner in which the wiring clip 200 engages with the kick plate of the vehicle using the kick plate slot 202 is further illustrated in FIG. 7.

In one or more embodiments, the first protrusion 204 may be a portion of the wiring clip 200 that is used to secure a carpet of the vehicle. For example, the first protrusion 204 may provide an additional point by which the carpet may be secured to the vehicle (given that the wiring clip 200 is secured to the vehicle as well).

In one or more embodiments, the one or more holes 206 may that may provide points of engagement for securing mechanisms used in association with the wiring clip 200. For example, a zip tie or similar type of securing mechanism may be tied around the wiring passing through the wiring clip 200 and may be secured against the wiring clip 200 using the one or more holes 206. These one or more holes 206 may exist at any location on the wiring clip 200 and any number of holes may be included. For example, multiple sets of holes 206 may be provided to provide for multiple points of engagement between a securing mechanism and the wiring clip 200.

Figure 3:
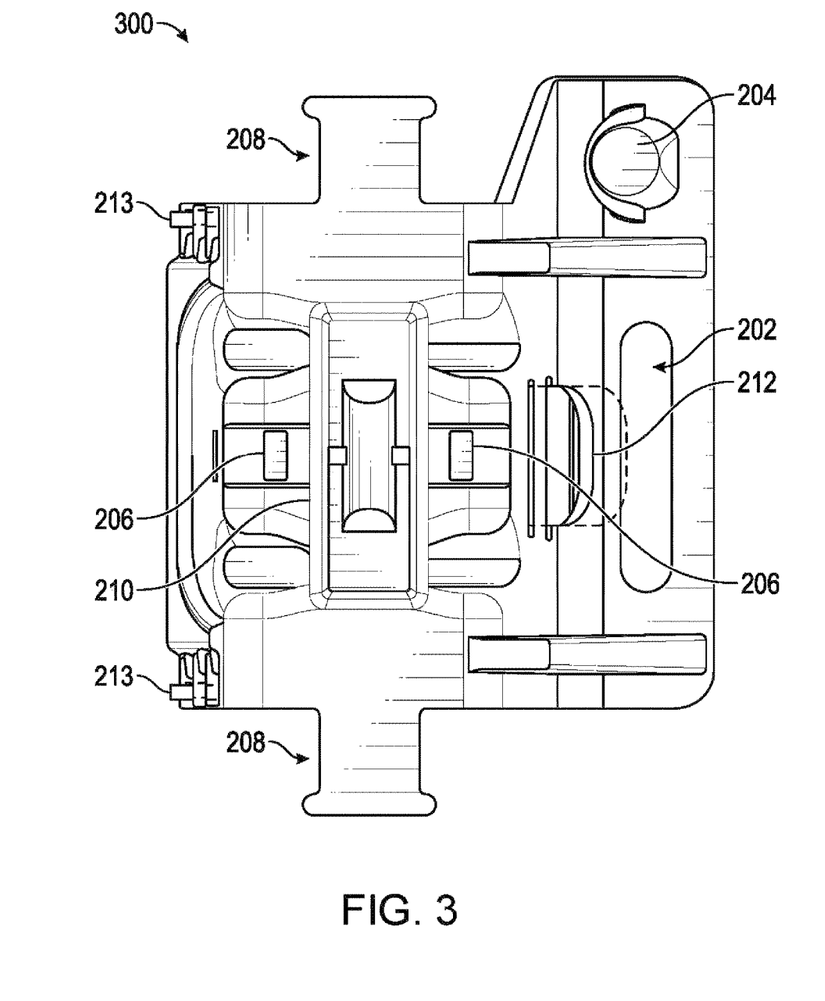
FIG. 3 illustrates an example wiring clip, in accordance with one or more embodiments of the disclosure.

In one or more embodiments, the second protrusion 208 may serve as a further point of engagement for securing mechanisms used in association with the wiring clip 200. Particularly, the second protrusion 208 may serve as a portion of the wiring clip 200 around which tape, a zip tie, and/or any other type of securing element that may be used to secure wiring to the wiring clip 200. For example, tape may wrap around the wiring and around the second protrusion 208, such that the wiring is then secured against the second protrusion 208 and the wiring clip 200. In some cases, the one or more holes 206 and the second protrusion 208 may simultaneously be used to provide multiple points by which the wiring is secured against the wiring clip 200. However, in some cases, only one of the one or more holes 206 and the second protrusion 208 may be used. Additionally, any number of second protrusions 208 may be provided on the wiring clip 200 as well (for example, as illustrated in FIG. 3).

In one or more embodiments, the retaining element 210 may be an element that is removably or permanently affixed to the wiring clip 200 that may be used to secure the wiring clip 200 to the vehicle. For example, the retaining element 210 may be an element that may be inserted into a hold within the vehicle to secure the wiring clip 200 to the vehicle. As illustrated in the figure, the retaining element 210 may be located on a bottom side of the wiring clip 200 such that the wiring clip 200 may be secured to the vehicle at a bottom side of the wiring clip 200 and the adjustable cover 212 (described below) and the wiring inside the area 214 may be easily accessible from the top side of the wiring clip 200. However, this is merely exemplary, and the retaining element 210 may be located at any other position of the wiring clip 200. Additionally, any number of retaining elements 210 may be used and/or the retaining element 210 may be provided in any other form rather than the form that is illustrated in the figure. For example, the wiring clip 200 may be affixed to the vehicle using an adhesive, another type of retaining element, and/or through any other suitable method.

In one or more embodiments, the adjustable cover 212 may be another element of the wiring clip 200 that may be used to prevent any wiring within the area 214 from moving from outside of the wiring clip 200. The adjustable cover 200 may be removably or permanently affixed to the wiring clip 200 at one or more engagement points (for example, engagement point 213, engagement point 214, and/or engagement point 215, as well as any other engagement points). The adjustable cover may be affixed to the wiring clip 200 at any of the engagement points depending on the thickness and/or number of wires that are passed through the wiring clip 200. For example, if smaller wires or a smaller number of wires are passing through the wiring clip 200, then the adjustable cover 212 may be affixed to the wiring clip 200 at the engagement point 215. Affixing the adjustable cover 212 at the engagement point 215 may reduce the area 214, which may more effectively secure the wires passing through the wiring clip 200. However, if thicker and/or a greater number of wires are used, the area 214 that exists in the wiring clip 200 if the adjustable cover 212 is affixed to the engagement point 215 may be insufficient for the wiring. In this scenario, the adjustable cover 212 may instead be affixed to engagement point 214 and/or engagement point 213 to provide additional space for the wires to fit within the wiring clip 200.

Furthermore, the adjustable cover 212 may also engage with one or more adjustable cover holes (for example, adjustable cover hole 216, adjustable cover hole 217, and/or any other number of adjustable covers). While the adjustable cover 212 is affixed to one of the engagement points on one side of the wiring clip 200, the adjustable cover 212 may also be removably affixed to one of the adjustable cover holes on the other side of the wiring clip 200. That is, a user may insert one end of the adjustable cover 212 into one of the adjustable cover holes to increase or decrease the size of the area 214. For example, inserting the adjustable cover 2112 into the adjustable cover hole 216 may increase the size of the area 214 relative to if the adjustable cover 212 were inserted into the adjustable cover hole 217. Although the figure illustrates a particular number of adjustable cover holes, any other number of adjustable cover holes may also be provided at any location.

In one or more embodiments, the adjustable cover 212 may be held within a given adjustable cover hole using one or more lateral extensions 221 that extend from the adjustable cover 212. For example, when the adjustable cover 212 is pushed through an adjustable cover hole, the lateral extensions 221 may catch against an exterior surface of the first upright 218. This may prevent the adjustable cover 212 from exiting the adjustable cover hole without manual intervention from a user (for example, the user pulling the adjustable cover 212 out from the adjustable cover hole). However, this is just one example of a manner in which the adjustable cover 212 may be secured within an adjustable cover hole, and any other suitable mechanism may be used as well.

It should be noted that the position of the kick plate slot 202, a first protrusion 204, one or more holes 206, a second protrusion 208, a retaining element 210, and/or an adjustable cover 212 on the wiring clip 200 are merely exemplary and are not intended to be limiting in any way. For example, any of the kick plate slot 202, a first protrusion 204, one or more holes 206, a second protrusion 208, a retaining element 210, and/or an adjustable cover 212 may be positioned on any other location on the wiring clip 200 as well. Additionally, any number of such elements may exist on the wiring clip 200. As one non-limiting example, multiple second protrusions 208 may be included as well.

FIG. 3 illustrates an example wiring clip 300, in accordance with one or more embodiments of the disclosure. Particularly, FIG. 3 illustrates the wiring clip 200 from a bottom-up perspective. The wiring clip 300 illustrates that the one or more holes 206 may also be located underneath the wiring clip 300 and multiple second protrusions 208 may exist. However, as aforementioned, these wiring clip illustrations (for example, wiring clip 200 and wiring clip 300) are merely exemplary and are not intended to be limiting in any way.

FIG. 4 illustrates an example vehicle 400, in accordance with one or more embodiments of this disclosure. Particularly, FIG. 4 illustrates the location of the kick plate 402 within the vehicle 400. As shown in the figure, the kick plate 402 may be located at a bottom portion of a door frame 401 of the vehicle 400. The figure may also illustrate that wiring 102 (for example, wiring 102 illustrated in FIG. 1) may be routed underneath the kick plate 402 of the vehicle 400. Thus, the kick plate 402 may serve as an effective portion of the vehicle 400 to which a wiring clip (such as wiring clip 200, for example) may be secured to the vehicle 400.

Figure 5:
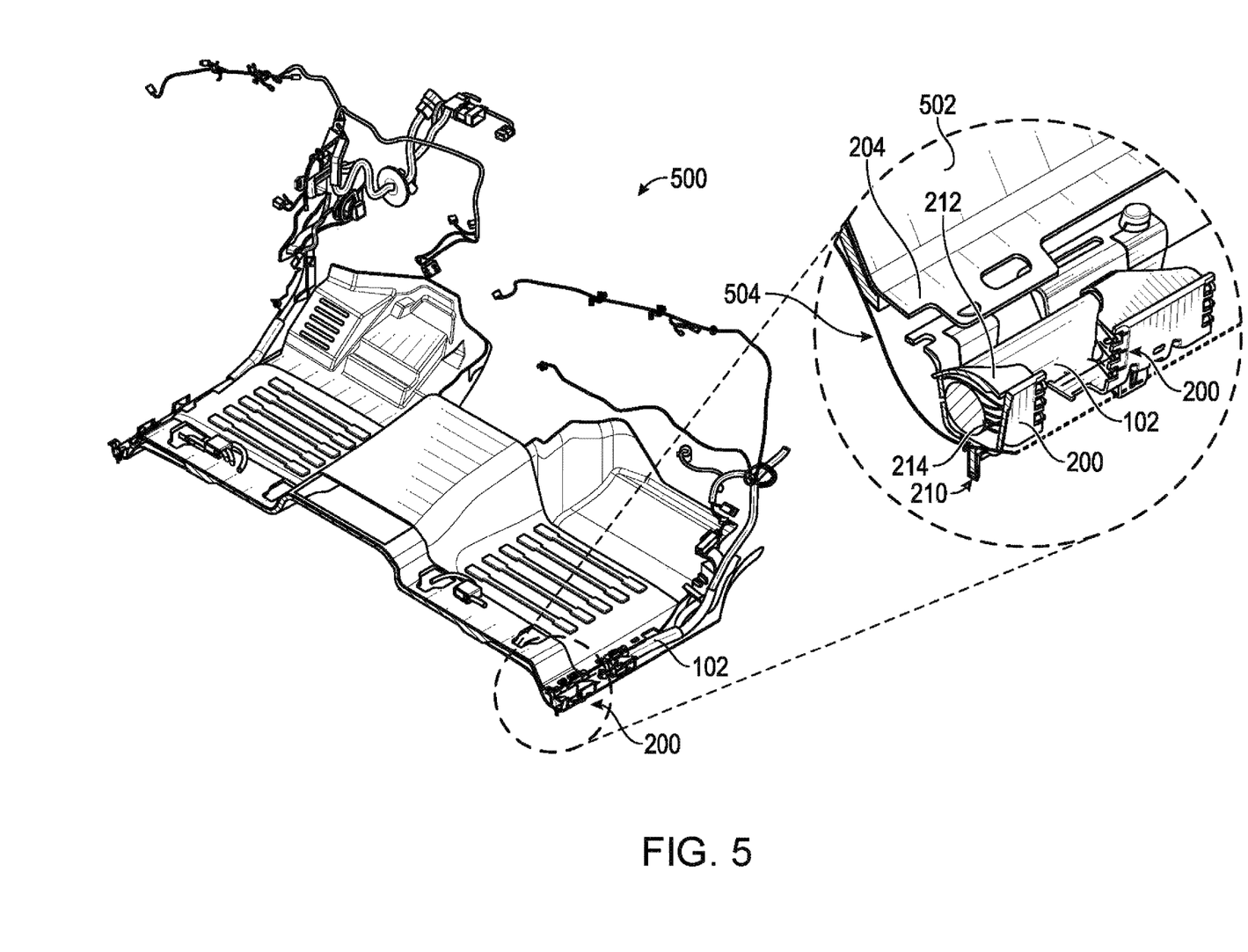
FIG. 5 illustrates an example integration of a wiring clip in a vehicle, in accordance with one or more embodiments of this disclosure.

FIG. 5 illustrates an example integration of one or more wiring clips 200 in a vehicle 500, in accordance with one or more embodiments of this disclosure. Particularly, the figure may illustrate an example manner in which wiring 102 may be secured within a wiring clip 200. For example, the figure illustrates that the wiring is included in an area 214 that is internal to the wiring harness 200 (for example, internal to the base, first upright, second upright, and adjustable cover 212). The adjustable cover may be adjusted such that the area 214 is sufficiently large for the wiring 102 to fit through the wiring clip 200 but sufficiently small that the wiring 102 experiences minimal movement within the wiring clip 200. The figure further illustrates an example of the wiring clip 200 being engaged with a carpet of the vehicle through the first protrusion 204 and a chassis 504 of the vehicle through the retaining element 210.

Figure 6:
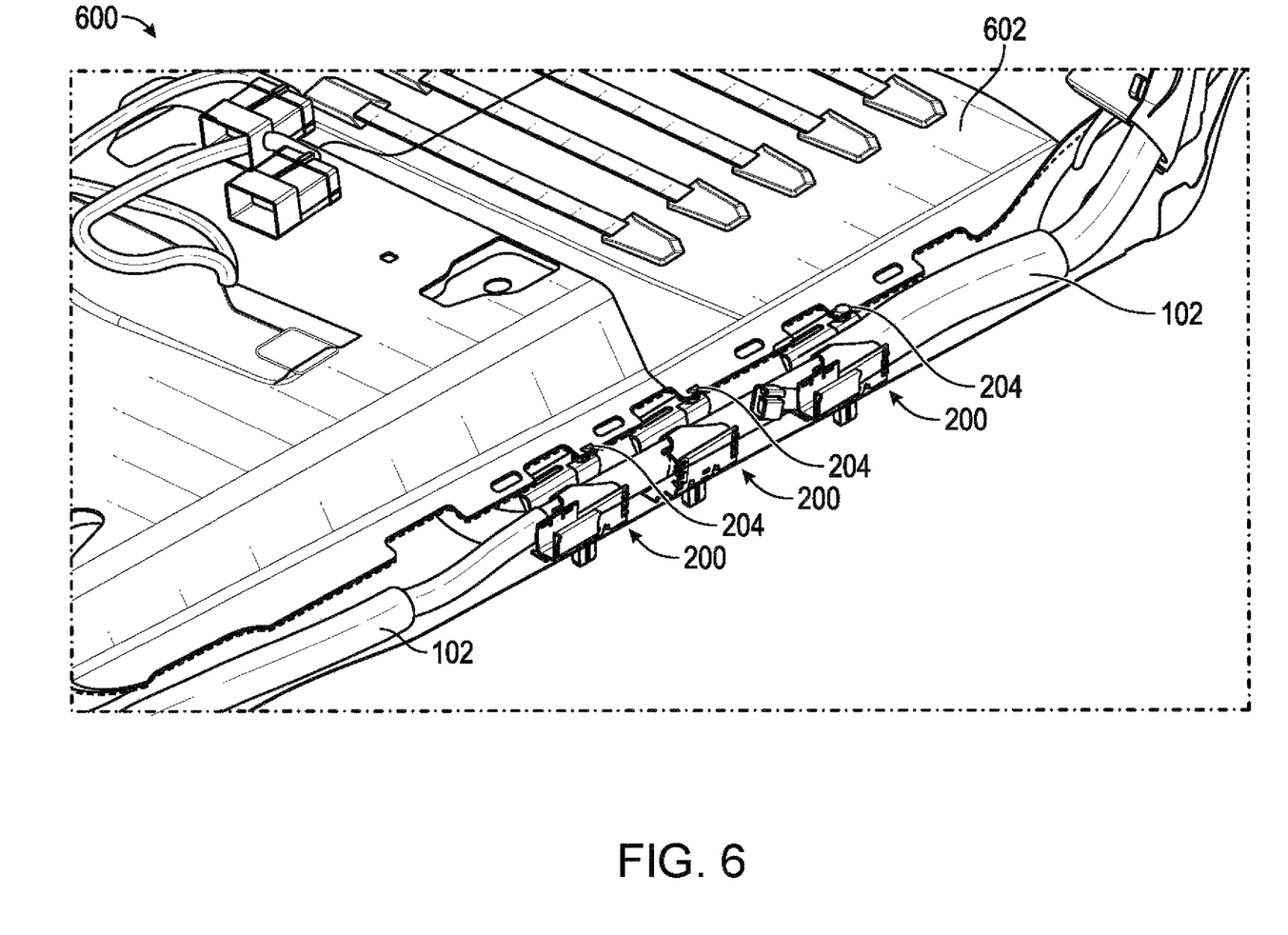
FIG. 6 illustrates an example integration of a wiring clip in a vehicle, in accordance with one or more embodiments of this disclosure.
Figure 7:
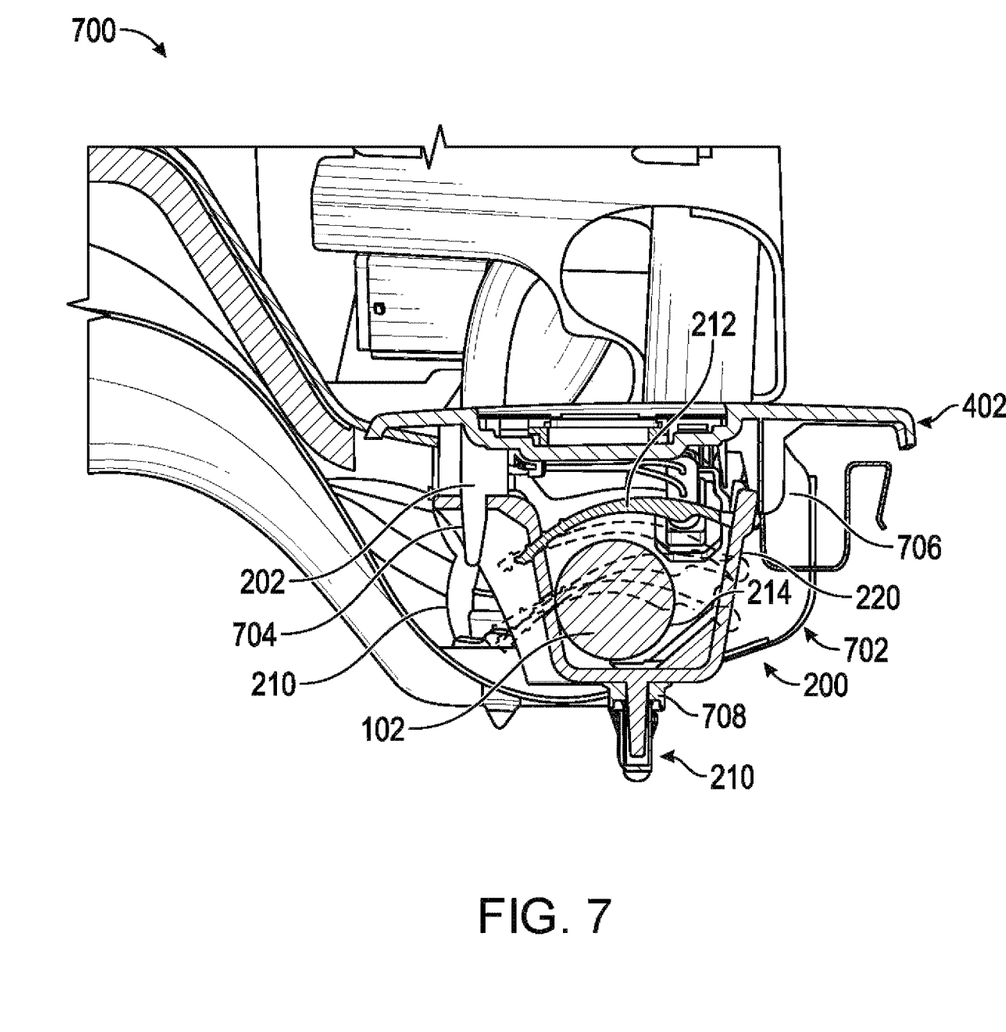
FIG. 7 illustrates an example integration of a wiring clip in a vehicle, in accordance with one or more embodiments of this disclosure.

FIG. 6 illustrates an example integration of a wiring clip in a vehicle, in accordance with one or more embodiments of this disclosure. Particularly, the figure may illustrate three wiring clips 200 through which wiring 102 of the vehicle is passing. The wiring 102 is secured within the wiring clips 200 such that the wiring is retained in place and does not move within the vehicle 600. The figure also illustrates an engagement between the first protrusion 204 and one or more carpets 602 of the vehicle 600. FIG. 7 illustrates an example integration of a wiring clip 200 in a vehicle 700, in accordance with one or more embodiments of this disclosure. Particularly, FIG. 7 illustrates an example manner in which the wiring clip 200 may be integrated with the kick plate 402 of the vehicle 700 and a chassis 702 (and/or any other structural element) of the vehicle 700. The figure also illustrates wiring that may be included within an area 214 of the wiring clip 200. Particularly, the figure may illustrate how the adjustable cover 212 of the wiring clip 200 may secure the wiring 102 within the wiring clip 200.

With respect to the engagement between the wiring clip 200 and the kick plate 402, the kick plate 402 may include one or more protrusions (such as a first kick plate protrusion 704 and a second kick plate protrusion 706). In one or more embodiments, the first protrusion 704 of the kick plate 402 may be inserted into the kick plate slot 202 of the wiring clip 200. This may provide one point of engagement between the wiring clip 200 and the kick plate 402 (and consequentially between the wiring clip 200 and the vehicle 700). Additionally, the second upright 220 of the wiring clip 200 may provide a force against the second kick plate protrusion 706, which may provide an additional point of engagement between the wiring clip 200 and the kick plate 402. This is just one example of a manner in which the kick plate 402 and wiring clip 200 may be secured together and is not intended to be limiting.

With respect to the engagement between the wiring clip 200 and the chassis 702 of the vehicle 700, the figure may illustrate that the retaining element 210 may be used to facilitate this engagement. Particularly, the retaining element 210 may be inserted into a hole 708. In this manner, the wiring clip 200 may also be secured to the vehicle 700 using the retaining element 210. In some cases, it may be beneficial to secure the wiring clip 200 to a flat portion of the chassis 702. However, this is not necessary and the retaining element 210 may provide a sufficient point of engagement with the vehicle 700 even on an angles portion of the chassis. It should be noted that the retaining element 210 may also secure the wiring clip 200 to any other structural element of the vehicle 700 besides the chassis 702 as well.

Figure 8:
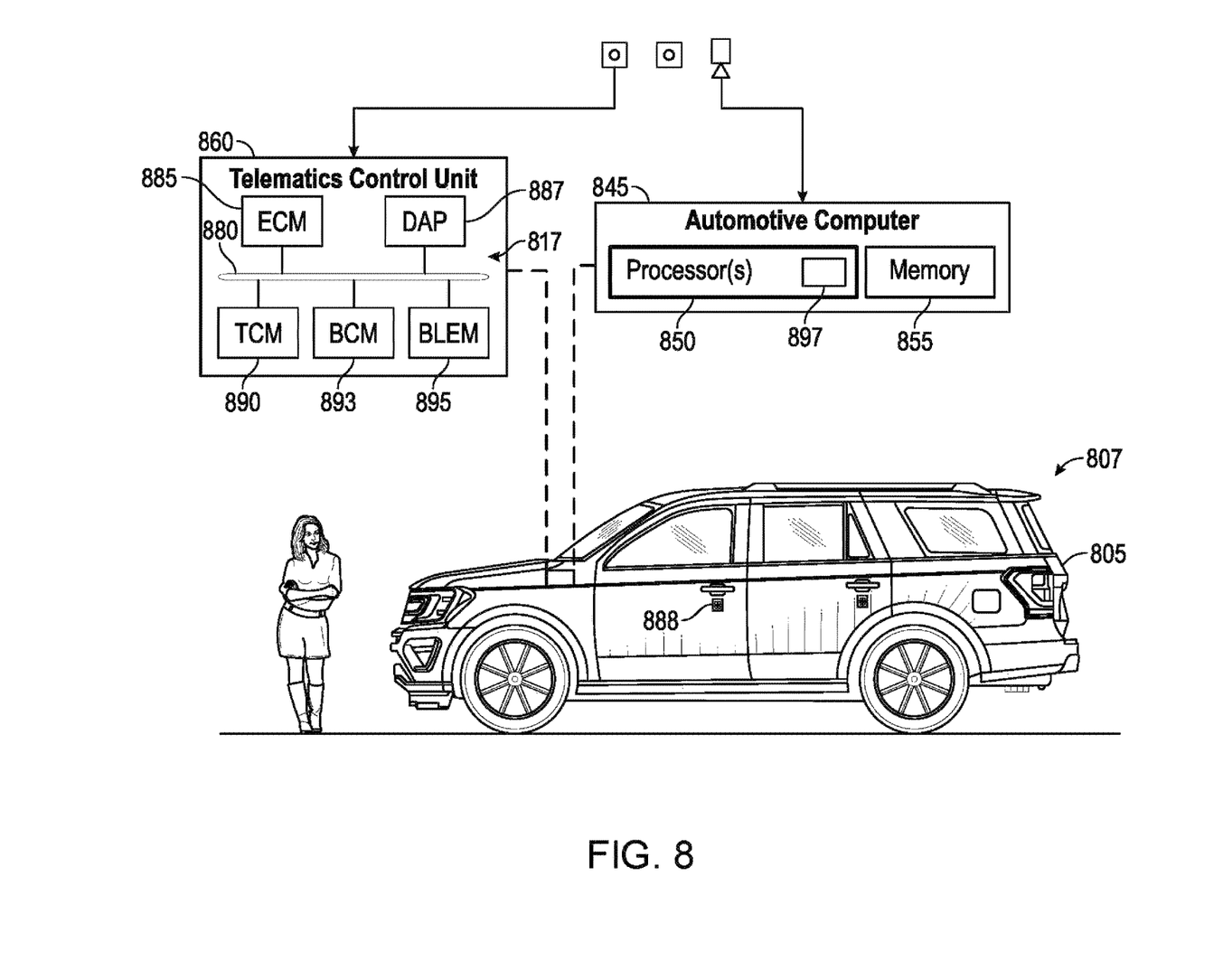
FIG. 8 illustrates an example vehicle system, in accordance with one or more embodiments of this disclosure.

FIG. 8 illustrates an example vehicle 800, in accordance with one or more embodiments of this disclosure. The vehicle 800 may include at least an automotive computer 845 and/or a Vehicle Controls Unit (VCU) 860. The vehicle 800 may also include any other types of electronic components, such as various types of sensors, for example.

In one or more embodiments, the automotive computer 845 may include one or more processor(s) 850 and memory 855. The VCU 860 may be disposed in communication with and/or be a part of the automotive computer 845. The VCU 860 may, in some example embodiments, be disposed in communication with one or more server(s) 870, which may be associated with and/or include a Telematics Service Delivery Network (SDN). The vehicle 805 may also receive and/or be in communication with a Global Positioning System (GPS) 875.

Although illustrated as a sport utility, the vehicle 805 may take the form of another passenger or commercial automobile such as, for example, a car, a truck, a sport utility, a crossover vehicle, a van, a minivan, a taxi, a bus, etc., and may be configured to include various types of automotive drive systems. Exemplary drive systems can include various types of internal combustion engine (ICE) powertrains having a gasoline, diesel, or natural gas-powered combustion engine with conventional drive components such as, a transmission, a drive shaft, a differential, etc. In another configuration, the vehicle 805 may be configured as an electric vehicle (EV). More particularly, the vehicle 805 may include a battery EV (BEV) drive system, or be configured as a hybrid EV (HEV) having an independent onboard powerplant, a plug-in HEV (PHEV) that includes a HEV powertrain connectable to an external power source, and including a parallel or series hybrid powertrain having a combustion engine powerplant and one or more EV drive systems. HEVs can include battery and/or supercapacitor banks for power storage, flywheel power storage systems, or other power generation and storage infrastructure. The vehicle 805 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 805 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level-4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

In one or more embodiments, The VCU 860 can be configured to provide vehicle connectivity to wireless computing systems onboard and offboard the vehicle 805, and may include a Navigation (NAV) receiver 888 for receiving and processing a GPS signal from the GPS 875, a Bluetooth® Low-Energy (BLE) Module (BLEM) 895, a Wi-Fi transceiver, an Ultra-Wide Band (UWB) transceiver, and/or other wireless transceivers (not shown in FIG. 8) that may be configurable for wireless communication between the vehicle 805 and other systems, computers, and modules. The TCU may be disposed in communication with the ECUs 817 by way of a bus 880. In some aspects, the TCU may retrieve data and send data as a node in a CAN bus. The one or more network(s) 825 illustrate an example of one possible communication infrastructure in which the connected devices may communicate. The one or more network(s) 825 may be and/or include the Internet, a private network, public network or other configuration that operates using any one or more known communication protocols such as, for example, transmission control protocol/Internet protocol (TCP/IP), Bluetooth®, Wi-Fi, and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The VCU 860 may provide a software and hardware infrastructure for performing aspects of the present disclosure. For example, the VCU 860 can provide communication and control access for two or more Electronic Control Units (ECUs) 817 using a Controller Area Network (CAN) bus 880.

The CAN bus 880 may be configured as a multi-master serial bus standard for connecting two ECUs as nodes using a message-based protocol that can be configured and/or programmed to allow the ECUs 817 to communicate with each other in applications. The CAN bus 880 may be or include a high speed CAN (which may have bit speeds up to 1 Mb/s on CAN, 5 Mb/s on CAN Flexible Data Rate (CAN FD)), and can include a low speed or fault tolerant CAN (up to 125 Kbps), which may use a linear bus configuration. In some aspects, the ECUs may communicate with a host computer (e.g., the automotive computer 845 and/or the server(s) 870, etc.), and may also communicate with one another without the necessity of a host computer. The CAN bus 880 may connect the ECUs 817 with the automotive computer 845 such that the automotive computer 845 may retrieve information from, send information to, and otherwise interact with the ECUs 817 to perform steps described according to embodiments of the present disclosure. The CAN bus 880 may connect CAN bus nodes (e.g., the ECUs 817) to each other through a two-wire bus, which may be a twisted pair having a nominal characteristic impedance.

The ECUs 817, when configured as nodes in the CAN bus 880, may each include a central processing unit, a CAN controller, and a transceiver (not shown in FIG. 8). In an example embodiment, the ECUs 817 associated with the VCU 860 can include an Engine Control Module (ECM) 885, a DAP controller 887, a Transmission Control Module (TCM) 890, a Body Control Module (BCM) 893, and/or the BLEM 895. In some aspects, the VCU 860 may control aspects of the vehicle 805 through the control modules 885, 887, 890, 893, 895, etc., and implement one or more instruction sets received from the application(s) 835 operating on the mobile device 820.

The BCM 893 is a processor-based power distribution center that can supervise and control functions related to the car body such as lights, windows, security, door locks and access control, and various comfort controls. The BCM 893 may also operate as a gateway for bus and network interfaces to interact with remote electronic control units (ECUs) for other systems. The ECUs 817 may control various loads directly via the CAN bus 880 communication or BCM 893.

The BCM 893 generally includes integration of sensors, vehicle performance indicators, and variable reactors associated with vehicle systems. The BCM 893 may coordinate a wide range of vehicle functionality and systems, including energy management systems, alarms, vehicle immobilizers, driver and rider access authorization systems, Phone-as-a-Key (PaaK) systems, driver assistance systems, AV control systems, power feature systems (e.g., windows, doors, actuators, etc.) and other functionality. The BCM 893 may be configured for vehicle energy management, exterior lighting control, wiper functionality, heating ventilation and air conditioning systems, and driver integration systems. In other aspects, the BCM 893 may control auxiliary equipment functionality, and/or be responsible for integration of such functionality with vehicle sub-systems (not shown in FIG. 8).

According to embodiments of the present disclosure, the BCM 893 may be operatively connected with the interface controller 887. The interface controller 887 may include a processor (not shown in FIG. 1) a computer-readable memory (not shown in FIG. 8), and a door access panel input/output device (described hereafter as the "interface device 888"). According to embodiments of the present disclosure, the interface device 888 may include a display that can receive user touch input, such as a touch screen or other mechanism. In other aspects, the interface device 888 may provide display output generated by the interface controller 887, including a list of user identifiers, a menu, an alpha-numeric keypad, a menu of selectable icons, a menu of selectable photographs, etc. The interface controller 887 may also be disposed in communication with the automotive computer 845, and may transmit information to an authentication manager 897 configured to coordinate command instructions to the VCU 860 for providing vehicle access, navigational access, AV systems control, etc.

The ECUs 817 are described for exemplary purposes only, and are not intended to be limiting or exclusive. Control and/or communication with other control modules not shown in FIG. 8 is possible, and such control is contemplated. For example, although discussed as a functionality of the automotive computer 845, it should be appreciated that the authentication manager 897 may be a part or functionality controlled with the BCM or the other ECUs 817 described herein.

The automotive computer 845 may include one or more processor(s) 850 and a computer-readable memory 855. The automotive computer 845 may be installed in an engine compartment of the vehicle 805 (or elsewhere in the vehicle 805). The automotive computer 845 may include, in one example, the one or more processor(s) 850, and a computer-readable memory 855. In other example embodiments, the VCU 860 may be integrated with and/or be incorporated with the automotive computer 845. The computing system architecture of the automotive computer 845 may omit certain computing modules. It should be readily understood that the computing environment depicted in FIG. 8 is one example of a possible implementation according to the present disclosure, and thus, it should not be considered limiting or exclusive.

The one or more processor(s) 850 may be disposed in communication with one or more memory devices (e.g., the memory 855 and/or one or more external databases (not shown in FIG. 8). The one or more processor(s) 850 may utilize the memory 855 to store programs in code and/or to store data for providing AV access using the system 807 in accordance with the disclosure. The memory 855 may be a non-transitory computer-readable memory. The processor(s) 850 may be configured to execute computer-executable instructions stored in the memory 855 for performing various functions of the system 807 as well as for performing vehicle control capabilities in accordance with the disclosure. Consequently, the memory 855 may be used for storing code and/or data code and/or data for performing operations in accordance with the disclosure.

The memory 855 can include any one or a combination of volatile memory elements (e.g., dynamic random access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The memory 855 may be one example of a non-transitory computer-readable medium, and may be used to store programs in code and/or to store data for performing various operations in accordance with the disclosure. The instructions in the memory 855 can include one or more separate programs, each of which can include an ordered listing of computer-executable instructions for implementing logical functions. In another exemplary implementation, some or all components of the automotive computer 845 may be shared with the VCU 860.

The memory 855 may store various code modules such as, for example, a secure communication controller (not shown in FIG. 8) for establishing the one or more wireless channels 830 (which may, in some embodiments, be encrypted channel(s)) between the mobile device 820, the VCU 860, and/or the automotive computer 845. The memory 855 may also receive the one or more instruction sets for providing vehicle access to rideshare customers (e.g., the user 840). The instruction sets may include encryption keys, stored PINs, hash results, PIN indices, user profiles associated with one or more users (e.g., the user 840), etc.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, techniques, and computer program products that, individually and in combination, certain systems and methods. It is, of course, not possible to describe every conceivable combination of components and/or methods for purposes of describing the various elements of the disclosure, but it can be recognized that many further combinations and permutations of the disclosed elements are possible. Accordingly, it may be apparent that various modifications can be made to the disclosure without departing from the scope or spirit thereof. In addition, or as an alternative, other embodiments of the disclosure may be apparent from consideration of the specification and annexed drawings, and practice of the disclosure as presented herein. It is intended that the examples put forth in the specification and annexed drawings be considered, in all respects, as illustrative and not limiting. Although specific terms are employed herein, they are used in a generic and descriptive sense only and not for purposes of limitation.

What is claimed is:

1. A wiring clip for a vehicle comprising:
a base;
a first upright extending from the base;
an adjustable cover including a first end configured to be affixed to the first upright;
a second upright extending from the base, wherein the wiring clip is configured to be removably affixed to the vehicle, wherein the wiring clip is configured to secure wiring of the vehicle within an area internal to the base, the first upright, the second upright, and the adjustable cover, wherein the second upright includes a first hole and a second hole, and wherein the wiring clip is configured to receive a second end of the adjustable cover through the first hole or the second hole; and
a third hole on the first upright that is configured to receive a protruding element of a kick plate of the vehicle.

2. The wiring clip of claim 1, further comprising a first protruding element configured to removably affix to a carpet of the vehicle.

3. The wiring clip of claim 1, further comprising a second protruding element that extends from the base, wherein the second protruding element is configured to receive a first securing element for securing the wiring to the wiring clip.

4. The wiring clip of claim 1, further comprising a retaining element affixed to the base that is configured to secure the wiring clip to a structure of the vehicle.

5. The wiring clip of claim 1, wherein the first upright includes a first protruding element, wherein the adjustable cover is affixed to the first upright using the first protruding element.

6. A vehicle comprising:
a wiring clip comprising:
a base;
a first upright extending from the base;
an adjustable cover including a first end configured to be affixed to the first upright;
a second upright extending from the base, wherein the wiring clip is configured to be removably affixed to the vehicle, wherein the wiring clip is configured to secure wiring of the vehicle within an area internal to the base, the first upright, the second upright, and the adjustable cover, wherein the second upright includes a first hole and a second hole, and wherein the wiring clip is configured to receive a second end of the adjustable cover through the first hole or the second hole; and
a third hole on the first upright that is configured to receive a first protruding element of a kick plate of the vehicle.

7. The vehicle of claim 6, further comprising a first protruding element configured to removably affix to a carpet of the vehicle.

8. The vehicle of claim 6, further comprising a second protruding element that extends from the base, wherein the second protruding element is configured to receive a first securing element for securing the wiring to the wiring clip.

9. The vehicle of claim 6, further comprising a retaining element affixed to the base that is configured to secure the wiring clip to a structure of the vehicle.

10. The vehicle of claim 6, wherein the first upright includes a first protruding element, wherein the adjustable cover is affixed to the first upright using the first protruding element.

11. A system comprising:
a wiring clip comprising:
a base;
a first upright extending from the base;
an adjustable cover including a first end configured to be affixed to the first upright;
a second upright extending from the base, wherein the wiring clip is configured to be removably affixed to a vehicle, wherein the wiring clip is configured to secure wiring of the vehicle within an area internal to the base, the first upright, the second upright, and the adjustable cover, wherein the second upright includes a first hole and a second hole, and wherein the wiring clip is configured to receive a second end of the adjustable cover through the first hole or the second hole; and
a third hole on the first upright that is configured to receive a first protruding element of a kick plate of the vehicle.

12. The system of claim 11, further comprising a first protruding element configured to removably affix to a carpet of the vehicle.

13. The system of claim 11, further comprising a second protruding element that extends from the base, wherein the second protruding element is configured to receive a first securing element for securing the wiring to the wiring clip.

14. The system of claim 11, further comprising a retaining element affixed to the base that is configured to secure the wiring clip to a structure of the vehicle.

* * * * *